Figure 1:
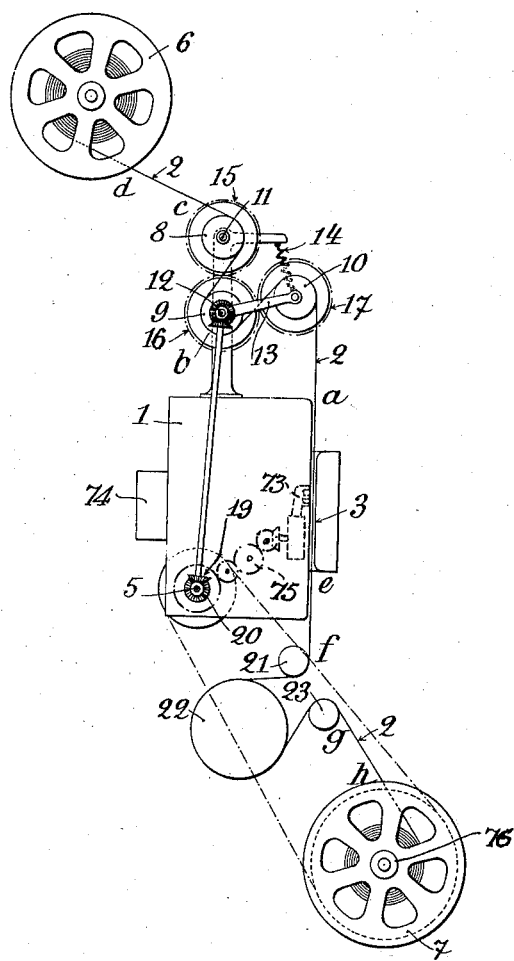

June 6, 1933.  E. OEHMICHEN  1,913,087
CINEMATOGRAPHIC APPARATUS
Filed Aug. 27, 1928

E. Oehmichen
INVENTOR

By: Marks & Clerk

Patented June 6, 1933

1,913,087

UNITED STATES PATENT OFFICE

ETIENNE OEHMICHEN, OF VALENTIGNEY, FRANCE

CINEMATOGRAPHIC APPARATUS

Application filed August 27, 1928, Serial No. 302,326, and in France September 6, 1927.

In the known cinematographic apparatus employed for view taking, printing, screen projection, and like operations, the film is drawn forward by an abrupt motion through the guideway provided with the aperture serving for the exposure or the screen projection of the film, and it has been found necessary to dispose at the input and the output ends of the guideway suitable toothed rollers, or film-drawing rollers, which rotate at a uniform rate and which draw forward the film by its perforations. One such roller draws the film from the unwinding bobbin towards the guideway; the second roller draws the film from the guideway towards the winding bobbin. The portion of the film comprised between the said film-drawing rollers is sufficiently long to form loose loops at the respective ends of the guideway, so that the abrupt traction exercised upon these parts of the film by the periodic film-drawing mechanism will not be imparted to the portions of the film situated between the portions of the film comprised between the bobbins and the film-drawing rollers.

Without this precaution, in fact, the bobbins which have a relatively heavy weight, and especially when carrying a great length of film, will be operated in an irregular manner, and the film which is at certain times suddenly stretched between the guideway and one or the other of the bobbins will be subjected to great stresses each time that the periphery speed of the bobbins differs appreciably from the periodically variable speed imparted to the portion of the film situated in the guideway.

Obviously, the film which is subjected to such stresses will be broken or put out of use in a short time, and chiefly in the perforated parts engaging the film drawing elements provided with teeth or claws, and further, the image will not have a fixed position on account of the tension produced in one or the other direction according to the case.

Hitherto it has been feasible to eliminate the film-drawing rollers only in the small apparatus employing relatively short films and hence using light bobbins having but little inertia; but in spite of this small inertia, it becomes necessary to reduce the prejudicial effects due to the irregular rotation of the bobbins and the irregular tension of the film, by employing brakes upon the said bobbins whose action varies automatically under the effect of the variations of the tension of the film. But this arrangement fails to answer the purpose as concerns the proper preservation of the films and the steady position of the images.

The present invention relates to a cinematographic apparatus without the use of toothed film-drawing rollers, and so disposed that even in the absence of such devices, and whatever the mass and the inertia of the winding and unwinding bobbins may be, no exaggerate tension will be imparted to the film, thereby securing a perfect steady position of the projection as well as a very large preservation of the film.

For the motion of the film towards the periodic film-drawing mechanism, I employ means adapted to supply a fresh quantity of film each time that the tension of the film at the input end of the guideway has a reduced value, and adapted to stop all forward motion when the film is slackened. When circulating between the guideway and the winding bobbin, the film passes over elements which serve to limit to a very small value the tension which the winding bobbin may exercise upon the film issuing from the said guideway.

For this purpose, I may utilize the various devices which have been described in the French patent in my name No. 633,405 of August 17, 1926 and No. 639,380 of the 15th of January 1927 and in the additions thereto, the same being used in cinematographic apparatus which comprise film-drawing rollers engaging the perforations of the film.

The appended diagrammatic drawing shows by way of example an embodiment of the invention.

1 is the case containing the known mechanism comprising teeth or claws 73 which impart to the portion of the film 2 traveling through the guideway 3 a periodic downward motion, allowing the successive travel of the pictures in front of the lens 74. The movement of the members 73 is obtained by means of any controlling device 75 connecting the said members to the shaft 5 to which a uniform revolving motion is imparted.

6 is the unwinding bobbin which rotates upon its axle and can if necessary be subjected to a slight permanent friction; 7 is the winding bobbin which is rotated at a uniform rate by the driving shaft 5 by means of suitable power transmission gear which preferably comprises a friction coupling 76 in order to provide for the slipping of the bobbin relatively to its control each time that the tension of the part of the film which is unwound attains a predetermined limit.

When proceeding from the unwinding bobbin to the guideway, the film travels upon the smooth surface of three driving rollers 8—9—10; the first two rollers rotate on the respective stationary axles 11—12; the roller 10 is mounted on an arm 13 pivoted on the axle 12 and under the control of a weak spring 14. These three rollers are combined with the respective pinions 15—17—18 whose gear ratio is such that all of the said rollers will have the same periphery speed. The roller 9 is connected with the driving shaft 5 by gear 19—20 in such manner that the common periphery speed of the three rollers will exceed the mean speed given to the film by the mechanism serving for the periodic forward motion (not shown).

It is to be understood that I avoid the necessity of employing toothed sprocket rollers, which have proven, in practice, to be a non-desirable construction.

On the other hand, when traveling from the said guideway to the winding bobbin, the film passes around three stationary friction elements 21—22—23 upon which it may be subjected to a great friction which is in direct relation to the variable tension.

As previously arranged, the elements 8—9—10—21—22—23 are preferably somewhat recessed at the middle part in order that only the margins of the film will be subject to friction, and that the images will not be scratched.

It is to be noted that in the present construction the feeding means has a smooth surface disposed at the entrance of the projection passage. Also stationary friction devices are placed at the end or exit of the passage.

The stationary friction device at the exit of the passages is found to be most efficient.

The operation is as follows:

Due to the adhesion thus produced, the film is at once drawn forward by said rollers, and a new portion of film is supplied to the mechanism serving for the periodic advance, and at a speed such that there will not be any great tension between the said mechanism and the rollers. Since the roller 10 may also be displaced due to the elasticity of the spring 14, there is no danger that the film will be suddenly stretched when drawn down and is brought upon the said rollers. Also, since the roller 10 is moved concentrically with the roller 9, the pinion 17 rolls upon the pinion 16 and is given an additional motion, so that the film upon the roller 10 will be drawn towards the guide-way at a speed which is still greater than the periphery speed of the rollers 8 and 9.

When the film is thus drawn forward due to its adhesion to the rollers 8, 9 and 10, its portion $c$—$d$ comprised between the roller 8 and the bobbin 6 will be stretched and will drive the said bobbin so that it may overcome the resistance due to the inertia of the said film-carrying bobbin, should the latter not rotate at a uniform rate. But the tension thus produced in the part $c$—$d$ offers no obstacle to the preservation of the film nor to the fixed condition of the projected image, firstly because the said tension cannot be imparted to the portion $a$—$b$ due to the relatively great length of the loops of the film in contact with the rollers 8—9—10, and secondly because the said tension is supported, not by the narrow surface of contact with the supply elements, but by the relatively large parts of the film in contact with the rollers 8—9—10.

When the downward traction exercised by the film-drawing mechanism ceases, the tension on the part $a$—$b$ at once disappears; the roller 10 is raised into the inoperative position, and the film which is slightly separated from the rollers 8—9—10 is no longer drawn forward by the latter, although the rollers continue to turn at a uniform rate.

On the other hand, each time that the film is drawn forward through the guideway, the portion $e\ f$ of the film situated between the guideway and the stationary friction element 21—22—23 becomes loose; and it is again gradually stretched due to the slipping of the film upon said parts as it is wound by the bobbin 7. Due to the relatively great length of the winding arcs on the said parts, the variable tensions which can be exercised by the bobbin 7 upon the part $g\ h$ of the film can only be imparted in a greatly reduced degree to the portion $e\ f$ of the film, and no obstacle will be offered to the stationary condition of the images nor will there be any appreciable traction exercised upon the claws or teeth of the periodic film-drawing mechanism.

It should be noted that instead of three film-drawing rollers 8—9—10, or three friction elements 21—22—23, a different number may be employed. It is not necessary to give a cylindrical form to the frictional parts, and frictional elements of any other suitable form may be employed. It is not even essential that the said elements should be stationary, for it will suffice that when placed in contact with the film they will delay its motion, on the contrary to the action of the rollers 8—9—10 which have accelerating friction surfaces. Otherwise stated, if I consider the relative speed of the said friction surfaces with reference to the mean speed of the film, which surfaces are situated on one or the other side of the operating point of the mechanism for the periodic travel of the film, it is necessary that the said relative speed shall be directed towards the said operating point.

By the use of such friction surfaces and due to the absence of toothed film drawing rollers, the part of the film controlled by the mechanism for the periodic travel of the film is practically shielded from all external efforts due to the inertia of the bobbins and to the control of the winding bobbin. Except for the friction of the film in the guideway, this portion is only required to support the efforts due to its own inertia which is very small.

I claim:

1. In a cinematographic apparatus, the combination of a projection gate, an unwinding reel and a winding reel, means for intermittently driving the film in the said gate, feeding members at the entrance of the said gate, the said members comprising rollers having an even surface on which the film passes, the said rollers rotating at a peripheral speed greater than the mean feeding speed of the film, the said film being frictionally driven by the said rollers as soon as the said intermittent driving means produce on the film a tension of small value, and fixed friction members on which the film passes when issuing from the said gate, means for causing the said last-mentioned members to frictionally limit to a small value, the tension which can be exerted by the said winding reel on the film issuing from the said gate.

2. In a cinematographic apparatus, the combination of a projection gate, an unwinding reel and a winding reel, means for intermittently driving the film in the said gate, feeding members at the entrance of the said gate, the said members comprising rollers having an even surface on which the film passes, gears connected to the said rollers and adapted to drive the latter at a peripheral speed greater than the mean feeding speed of the film, the said film being frictionally driven by the said rollers as soon as the said intermittent driving means produce on the film a tension of small value, and fixed friction members on which the film passes when issuing from the said gate, means for causing the said last-mentioned members to frictionally limit to a small value, the tension which can be exerted on the film issuing from the said gate.

3. In a cinematographic apparatus, the combination of a projection gate, an unwinding reel and a winding reel, means for intermittently driving the film in the said gate, feeding members at the entrance of the said gate, the said members comprising three rotary rollers the axes of the first two rollers being stationary, and the axis of the third roller being movable concentrically with the second roller, resilient means for restoring the third roller in opposition to the tension exerted by the film on the said roller, gears connected to the said rollers and adapted to drive the latter at a peripheral speed greater than the mean feeding speed of the film, the said film being frictionally driven by the said rollers as soon as the said intermittent driving means produce on the film a tension of small value, and relatively fixed friction members on which the film passes when issuing from the said gate, the said members frictionally limiting to a small value the tension which can be exerted by the said winding reel on the film issuing from the said gate.

In testimony whereof I have hereunto affixed my signature.

ETIENNE OEHMICHEN.